(12) United States Patent
Tokashiki et al.

(10) Patent No.: US 8,140,736 B2
(45) Date of Patent: Mar. 20, 2012

(54) DATA MANAGEMENT APPARATUS, DATA MANAGEMENT METHOD, AND PROGRAM

(75) Inventors: Mamoru Tokashiki, Tokyo (JP); Jun Hirai, Tokyo (JP); Ryuji Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 12/114,955

(22) Filed: May 5, 2008

(65) Prior Publication Data

US 2008/0282021 A1    Nov. 13, 2008

(30) Foreign Application Priority Data

May 7, 2007    (JP) ................................ P2007-122114

(51) Int. Cl.
*G06F 13/00* (2006.01)
(52) U.S. Cl. ................. 711/100; 711/E12.001
(58) Field of Classification Search .......... None
See application file for complete search history.

(56) References Cited

U.S. PATENT DOCUMENTS 5,623,305 A * 4/1997 Ishizuka et al. ............ 348/208.8
2008/0024509 A1 * 1/2008 Couvert et al. ............... 345/569

FOREIGN PATENT DOCUMENTS

JP    2004-318856    * 11/2004

* cited by examiner

*Primary Examiner* — Hetul Patel
(74) *Attorney, Agent, or Firm* — Frommer Lawrence & Haug LLP; William S. Frommer; Thomas F. Presson (57) ABSTRACT

A data management apparatus for managing data stored in a predetermined storage area includes a reader configured to communicate with a plurality of objects each having a memory storing an address indicating a storage area and to read the address from the memory of an object with which communication is to be performed by a user among the plurality of objects; a data obtaining unit configured to obtain data to be stored in the storage area; and a storage controller configured to cause the data obtained by the data obtaining means to be stored in the storage area indicated by the address read by the reader.

10 Claims, 7 Drawing Sheets

| CARD ID | ADDRESS | PASSWORD | DATA PROCESSING INFORMATION | PROCESS STATE |
|---------|---------|----------|-----------------------------|---------------|
| 0123abcd | http://*.*/strage/12GBusers/* | ****** | F1,F3 | S10 |
| 4567efgh | http://*.*/strage/24GBusers/* | ****** | F1 | S20 |
| ⋮ | ⋮ | ⋮ | ⋮ | ⋮ |
|  |  |  |  |  |

| CARD ID | ADDRESS | PASSWORD | DATA PROCESSING INFORMATION | PROCESS STATE |
|---|---|---|---|---|
| 0123abcd | http://*.*/strage/12GBusers/* | ****** | F1,F3 | S10 |
| 4567efgh | http://*.*/strage/24GBusers/* | ****** | F1 | S20 |
| ... | ... | ... | ... | ... |

DATA MANAGEMENT APPARATUS, DATA MANAGEMENT METHOD, AND PROGRAM

CROSS REFERENCES TO RELATED APPLICATIONS

The present invention contains subject matter related to Japanese Patent Application JP 2007-122114 filed in the Japanese Patent Office on May 7, 2007, the entire contents of which are incorporated herein by reference.

BACKGROUND OF THE INVENTION

1. Field of the Invention

The present invention relates to a data management apparatus, a data management method, and a program. More particularly, the present invention relates to a data management apparatus capable of easily managing data, a data management method for use therewith, and a program for use therewith.

2. Description of the Related Art

In the related art, in a video camera, an image of a subject is captured in response to an operation performed by a user, and a video image obtained as a result of the image capturing is recorded on a medium, such as a digital video cassette tape or a DVD (digital versatile disc). The user performs management of video images by physically managing media on which video images have been recorded, for example, by storing the media in predetermined positions.

Furthermore, in a personal computer in which a storage unit such as a hard disk is incorporated, data such as video images is stored in the storage unit. The personal computer displays a GUI (Graphical User Interface), such as one including icons virtually representing data of video images, on a display, and the user operates icons in order to manage video images.

Furthermore, when a personal computer is connected to a server (a so-called server that provides storage services) that provides a predetermined storage area via a network, and a storage system formed by the server and the personal computer is constructed, the personal computer transmits data such as video images to the server, whereby the data is stored in the predetermined storage area in the server. Also, in such a storage system, the user performs management of video images by operating icons displayed on the display of the personal computer.

For example, in a personal computer, icons representing data of video images and icons representing storage areas in the server serving as a storage destination are displayed on a display, so that the user can move an icon on the display by operating input means, such as a keyboard, a mouse, or a remote commander. Then, when the user moves an icon representing data of a video image to an icon representing a storage area in the server in such a manner that they overlap with each other, the video image is stored in the storage area.

Here, a technology has been disclosed in which, as a result of the user holding a mobile phone, containing an IC (integrated circuit)-chip, near a reader/writer, the IC chip performs communication with the reader/writer, is connected to a server via the communication network of the mobile phone, and performs various kinds of processing using programs and/or data stored in the server (see, for example, Japanese Unexamined Patent Application Publication No. 2002-354546).

Furthermore, a technology has been disclosed in which, as a result of the user holding an IC card in which authentication information used to authenticate a user is stored near a mobile terminal including an IC card reader, the mobile terminal performs communication via a network, and a predetermined authentication process is performed (see, for example, Japanese Unexamined Patent Application Publication No. 2004-318856).

SUMMARY OF THE INVENTION

As described above, it is possible for the user to manage video images by operating icons virtually representing data of video images. However, depending on a user, such management of video images is more difficult than management of video images based on managing physical media, such as digital video cassette tapes and DVDs, and it has been difficult to manage video images by operating virtual icons.

The present invention has been made in view of such circumstances. It is desirable to facilitate easy management of data.

According to an embodiment of the present invention, there is provided a data management apparatus for managing data stored in a predetermined storage area, the data management apparatus including: reading means for communicating with a plurality of objects each having a memory storing an address indicating a storage area and for reading the address from the memory of an object with which communication is to be performed by a user among the plurality of objects; data obtaining means for obtaining data to be stored in the storage area; and storage control means for causing the data obtained by the data obtaining means to be stored in the storage area indicated by the address read by the reading means.

According to another embodiment of the present invention, there is provided a data management method for managing data stored in a predetermined storage area or a program for causing a computer to perform a data management process for managing data stored in a predetermined storage area, the data management method or the program including the steps of communicating with a plurality of objects each having a memory storing an address indicating a storage area and reading the address from the memory of an object with which communication is to be performed by a user among the plurality of objects; obtaining data to be stored in the storage area; and causing the data to be stored in the storage area indicated by the address.

In the embodiments of the present invention, communication is performed between a plurality of objects each having a memory in which an address indicating a storage area is stored, and an address is read from the memory of the object with which communication is to be performed by the user among the plurality of objects. Then, when data to be stored in the storage area is obtained, the data is stored in the storage area indicated by the address.

According to the embodiments of the present invention, data can be easily managed.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A data management apparatus according to an embodiment of the present invention is a data management apparatus for managing data stored in a predetermined storage area, including: reading means (for example, a card R/W 22 in FIG. 2) for communicating with a plurality of objects each having a memory storing an address indicating a storage area and for reading the address from the memory of an object with which communication is to be performed by a user among the plurality of objects; data obtaining means (for example, an image-capturing unit 23 in FIG. 2) for obtaining data to be stored in the storage area; and storage control means (for example, a controller 27 in FIG. 2 that performs the process of step S18 in FIG. 5) for causing the data obtained by the data obtaining means to be stored in the storage area indicated by the address read by the reading means.

The data management apparatus according to the embodiment of the present invention may further include data list obtaining means (for example, a controller 47 in FIG. 3 that performs the processes of steps S30 and S31 in FIG. 6) for obtaining a data list that is a list of data stored in the storage area indicated by the address read by the reading means; and data reading means (for example, the controller 47 in FIG. 3 that performs the processes of steps S32 and S33 in FIG. 6) for reading, from the storage area, data specified by the user within the data contained in the data list obtained by the data list obtaining means.

A data management method or a program according to another embodiment of the present invention is a data management method for managing data stored in a predetermined storage area or a program for causing a computer to perform a data management process for managing data stored in a predetermined storage area, the data management method or the program including the steps of: communicating (for example, step S13 in FIG. 5) with a plurality of objects each having a memory storing an address indicating a storage area and reading the address from the memory of an object with which communication is to be performed by a user among the plurality of objects; obtaining (for example, step S18 in FIG. 5) data to be stored in the storage area; and causing (for example, step S18 in FIG. 5) the data to be stored in the storage area indicated by the address.

Specific embodiments of the present invention will now be described below in detail with reference to the drawings.

Figure 1:
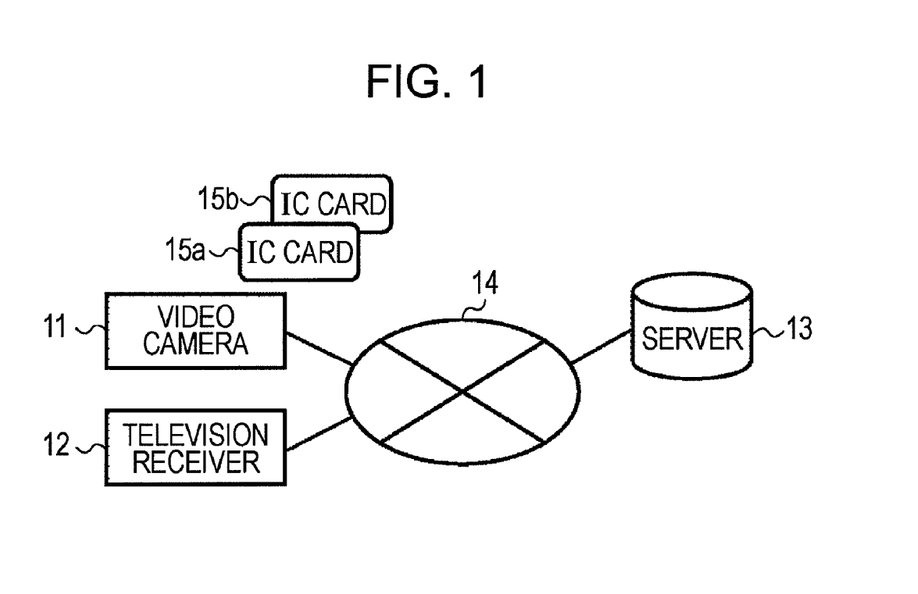
FIG. 1 shows an example of the configuration of an embodiment of a storage system according to the present invention.

FIG. 1 shows an example of the configuration of an embodiment of a storage system to which the present invention is applied.

In FIG. 1, the storage system includes a video camera 11, a television receiver 12, a server 13, a network 14, and IC cards 15*a* and 15*b*. The video camera 11, the television receiver 12, and the server 13 are connected to one another via a network 14.

The video camera 11 captures an image of a subject in response to an operation performed by the user, transmits a video image obtained thereby to the server 13 via the network 14, and causes the video image to be stored in a predetermined storage area provided by the server 13.

The television receiver 12 receives a broadcast signal transmitted from a broadcast station (not shown), transmits a video image to be recorded among the video images obtained by demodulating the broadcast signal to the server 13 via the network 14, and causes the video image to be stored in a predetermined storage area provided by the server 13. Furthermore, the television receiver 12 reads the video image stored in the predetermined storage area provided by the server 13 from the server 13 via the network 14, and reproduces the video image.

The server 13 provides predetermined storage areas for devices, such as the video camera 11 and the television receiver 12, which are connected via the network 14. That is, the server 13 stores video images transmitted from the video camera 11 and the television receiver 12 in the predetermined storage areas, and transmits video images stored in the predetermined storage areas in response to a request from the video camera 11 and the television receiver 12.

The network 14 may be any one of various kinds of networks including the Internet, a LAN (Local Area Network), a telephone line, and a CATV (cable television).

The IC card 15*a* performs short-distance communication with the video camera 11 or the television receiver 12, and the IC card 15*b* also performs short-distance communication with the video camera 11 or the television receiver 12. In the memory possessed by the IC card 15*a* or 15*b*, a card ID (Identification) for identifying individual IC cards and an address (access path) indicating a predetermined storage area of the server are stored.

For example, in the IC card 15*a*, an address indicating a storage area A of the server 13 is stored, and in the IC card 15*b*, an address indicating a storage area B of the server 13 is stored. In this case, by purchasing the IC card 15*a*, the user can use the storage area A of the server 13, which is indicated by the address stored in the IC card 15*a*, and by purchasing the IC card 15*b*, the user can use the storage area B of the server 13, which is indicated by the address stored in the IC card 15*b*.

More specifically, when the user holds the IC card 15*a* near the video camera 11, the video camera 11 transmits the captured video image to the server 13 via the network 14, whereby the captured video image is stored in the storage area A of the server 13. When the user holds the IC card 15*b* near the video camera 11 in place of the IC card 15*a*, the video camera 11 transmits the captured video image to the server 13 via the network 14, whereby the captured video image is stored in the storage area B of the server 13.

Furthermore, for example, when a video image is to be stored in the storage area A of the server 13, in the case that the user holds the IC card 15*a* near the television receiver 12, the television receiver 12 causes the video image stored in the storage area A of the server 13 to be transmitted via the network 14, and reproduces the video image. When a video image is to be stored in the storage area B of the server 13, in the case that the user holds the IC card 15*b* near the television receiver 12, the television receiver 12 causes the video image stored in the storage area B of the server 13 to be transmitted via the network 14, and reproduces the video image.

Figure 2:
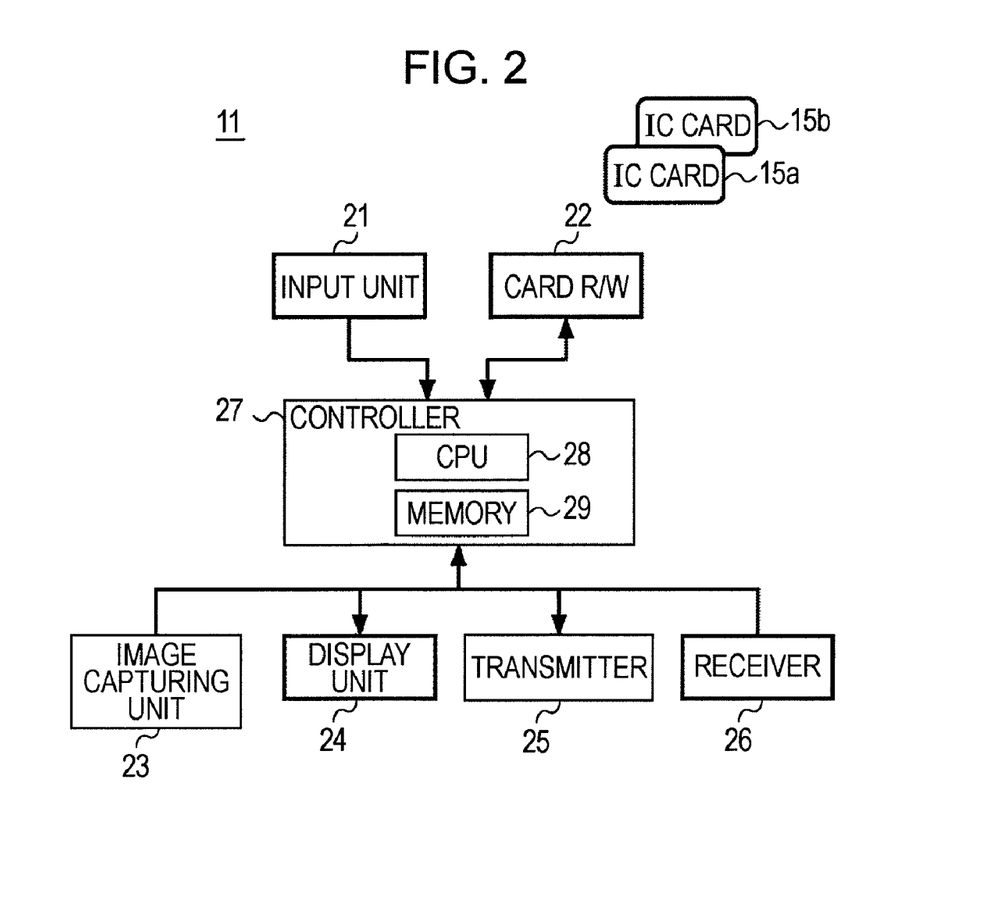
FIG. 2 is a block diagram showing an example of the configuration of a video camera 11.

Next, FIG. 2 is a block diagram showing an example of the configuration of the video camera 11 of FIG. 1.

The video camera 11 includes an input unit 21, a card R/W (Reade R/Writer) 22, an image-capturing unit 23, a display unit 24, a transmitter 25, a receiver 26, and a controller 27.

The input unit 21 is formed of a switch button (not shown) and the like. When the input unit 21 is operated by the user, the input unit 21 supplies an operation signal corresponding to the operation of the user to the controller 27.

The card R/W 22 performs short-distance communication with the IC card 15a or 15b. As described above, for example, in the IC card 15a, a card ID for identifying the IC card 15a and an address indicating the storage area A of the server 13 are stored. When the user holds the IC card 15a near the card R/W 22, the card R/W 22 reads the card ID and the address from the IC card 15a, and supplies them to the controller 27.

The image-capturing unit 23 is formed of a lens and an image-capturing element, which are not shown in the figure. The image-capturing unit 23 supplies a video image obtained as a result of image capturing to the display unit 24 or the transmitter 25 under the control of the controller 27.

The display unit 24 is formed of an LCD (Liquid Crystal Display) and the like, and displays a video image captured by the image-capturing unit 23. The display unit 24 displays a message to be notified to the user in response to the control of the controller 27.

The transmitter 25 and the receiver 26 perform transmission and reception of data to and from the server 13 via the network 14 of FIG. 1.

Under the control of the controller 27, the transmitter 25 transmits, to the server 13, for example, a command requesting access to the storage area A of the server 13, which is indicated by the address read by the card R/W 22 from the IC card 15a, data of a video image captured by the image-capturing unit 23, and the like.

When a response for the command requesting access, which is transmitted from the transmitter 25, is transmitted from the server 13, the receiver 26 receives the response and supplies it to the controller 27.

The controller 27 is formed of a CPU (Central Processing Unit) 28, a memory 29, and the like.

The CPU 28 executes a program stored in the memory 29 and controls each section constituting the video camera 11.

The memory 29 is formed of, for example, a ROM (Read Only Memory), a RAM (Random Access Memory), an EEPROM (Electrically Erasable and Programmable ROM), or the like, and stores a program to be executed by the CPU 28, data necessary for the CPU 28 to execute the program, and the like as appropriate.

For example, when the user holds the IC card 15a near the card R/W 22, the card R/W 22 reads the card ID and the address, which are stored in the IC card 15a, and supplies them to the controller 27, the controller 27 controls the transmitter 25 so as to transmit, to the server 13, a command requesting access to the storage area A of the server 13, which is indicated by the address read from the IC card 15a.

Thereafter, when, for example, a response indicating the fact that the authentication for the access request from the video camera 11 has succeeded is transmitted from the server 13, and the receiver 26 receives the response and supplies it to the controller 27, the controller 27 controls the transmitter 25 so as to transmit the video image captured by the image-capturing unit 23 to the server 13, whereby the video image is stored in the storage area A of the server 13.

Figure 3:
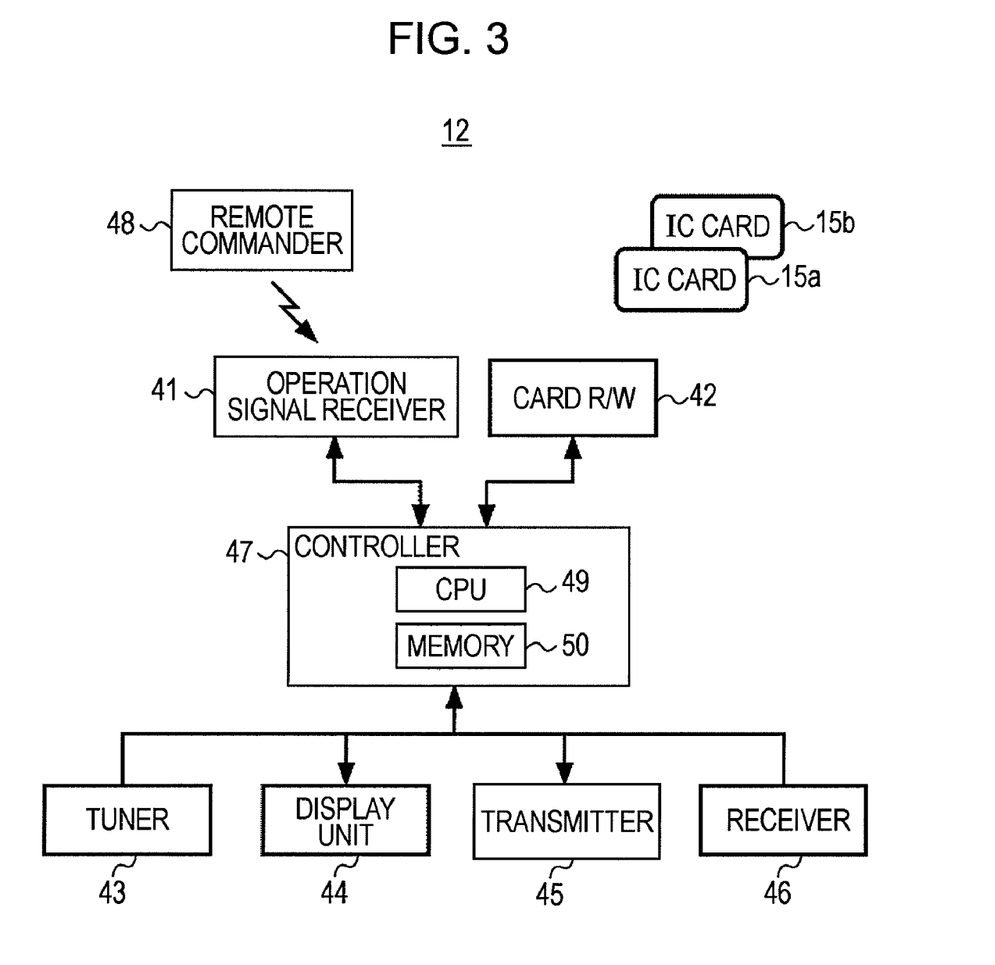
FIG. 3 is a block diagram showing an example of the configuration of a television receiver 12.

Next, FIG. 3 is a block diagram showing an example of the configuration of the television receiver 12 of FIG. 1.

In FIG. 3, the television receiver 12 includes an operation signal receiver 41, a card R/W 42, a tuner 43, a display unit 44, a transmitter 45, a receiver 46, a controller 47, and a remote commander 48. The controller 47 is formed of a CPU 49 and a memory 50.

Here, the card R/W 42, the display unit 44, the transmitter 45, the receiver 46, the controller 47, the CPU 49, and the memory 50 of the television receiver 12 are configured identically to the card R/W 22, the display unit 24, the transmitter 25, the receiver 26, the controller 27, the CPU 28, and the memory 29 of the video camera 11 of FIG. 2, respectively. In the following, the descriptions thereof are omitted as appropriate.

The operation signal receiver 41 receives an operation signal transmitted from the remote commander 48. That is, when the user operates the remote commander 48, the remote commander 48 transmits an operation signal corresponding to the operation. The operation signal receiver 41 receives the operation signal transmitted from the remote commander 48 in the manner described above, and supplies it to the controller 47.

A broadcast signal of a digital broadcast received by an antenna (not shown) is supplied to the tuner 43. Under the control of the controller 47, the tuner 43 selects a broadcast signal of a desired channel among the broadcast signals supplied thereto and demodulates the broadcast signal, and supplies a video image obtained as a result of the demodulation to the display unit 44, whereby the video image is displayed. Furthermore, under the control of the controller 47, the tuner 43 supplies the video image obtained by demodulating the broadcast signal to the transmitter 45, whereby the video image is transmitted.

The remote commander 48 is operated by the user when the television receiver 12 is to be remotely controlled, and wirelessly transmits, to the operation signal receiver 41, an operation signal in the form of an infrared ray, an electromagnetic wave, or the like, corresponding to the operation of the user. The remote commander 48 includes buttons, a joystick, and the like operated by the user.

It is assumed that, for example, a video image has already been stored in the storage area B of the server 13 indicated by the address stored in the IC card 15b. Then, when the user holds the IC card 15b near the card R/W 42 of the television receiver 12, the card R/W 42 reads the card ID and the address from the IC card 15b and supplies them to the controller 47. The controller 47 controls the transmitter 45 so as to transmit, to the server 13, a command requesting access to the storage area B of the server 13 indicated by the address supplied from the card R/W 42.

Then, for example, when a response indicating the success of the authentication for the access request from the television receiver 12 is transmitted from the server 13 and thereafter, a list of video images stored in the storage area B of the server 13 is transmitted, the controller 47 causes icons indicating video images stored in the storage area B of the server 13 to be displayed on the display unit 44 on the basis of the list of video images.

Then, when the user operates the remote commander 48 in order to select a desired icon, and instructs the reproduction of the video image indicated by the icon, the controller 47 controls the transmitter 45 so as to cause the server 13 to transmit a command requesting transmission of the video image whose reproduction is instructed by the user. Thereafter, when the video image is transmitted from the server 13 in response to the command, the receiver 46 receives the video image, and supplies the video image to the display unit 44, whereby the video image is displayed. As a result, the video image whose reproduction has been instructed is reproduced.

Figure 4:
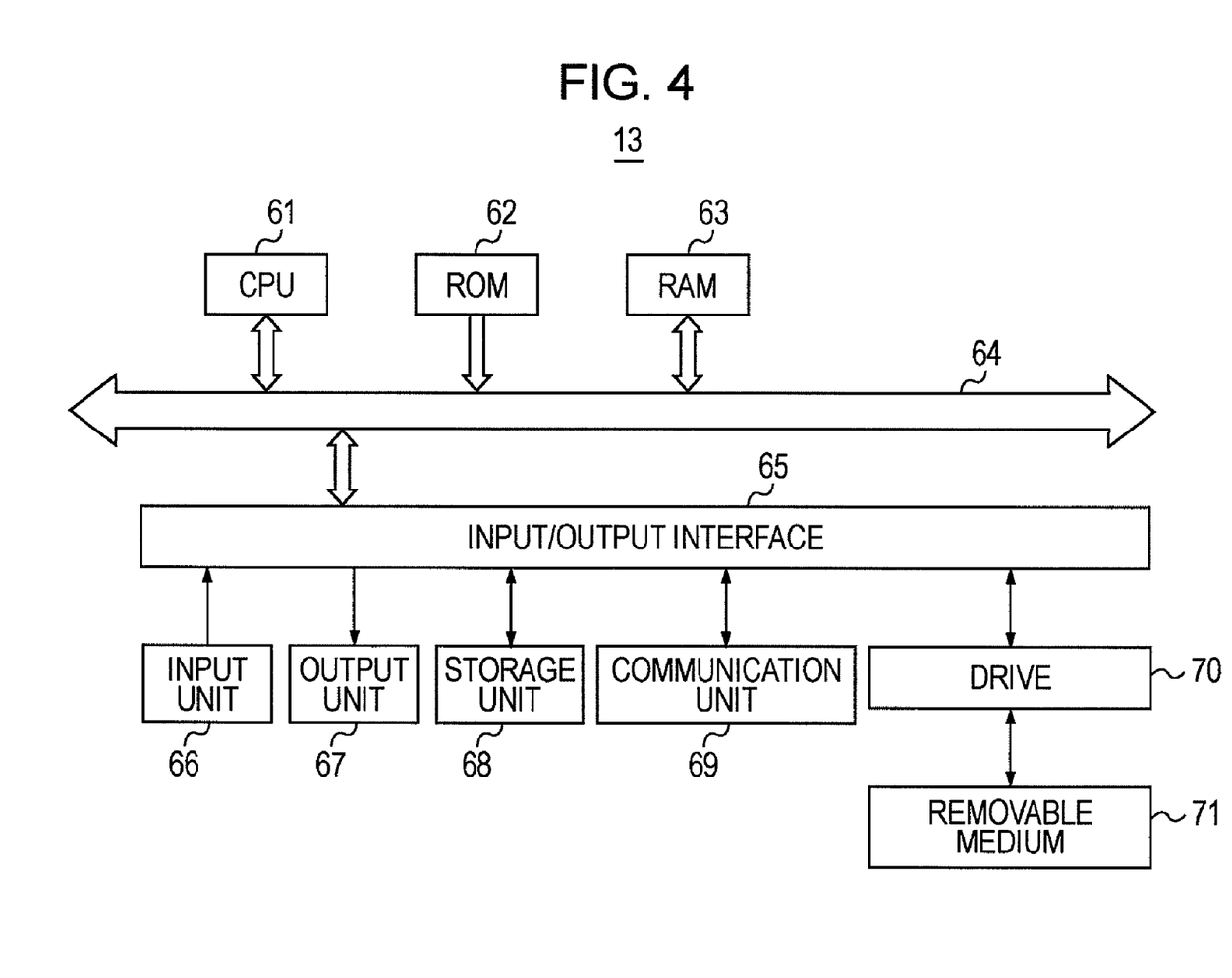
FIG. 4 is a block diagram showing an example of the configuration of a server 13.

Next, FIG. 4 is a block diagram showing an example of the configuration of the server 13 of FIG. 1.

In FIG. 4, the server 13 includes a CPU 61, a ROM 62, a RAM 63, a bus 64, an input/output interface 65, an input unit 66, an output unit 67, a storage unit 68, a communication unit 69, and a drive 70.

The CPU 61, the ROM 62, and the RAM 63 are interconnected to one another via the bus 64, and the input/output interface 65 is also connected to the bus 64. In addition to the bus 64, the input unit 66, the output unit 67, the storage unit 68, the communication unit 69, and the drive 70 are connected to the input/output interface 65.

The CPU 61 executes various kinds of processing in accordance with a program stored in the ROM 62 or in accordance with a program loaded into the RAM 63 from the storage unit 68 via the input/output interface 65 and the bus 64. The ROM 62 has stored therein a program to be executed by the CPU 61. The RAM 63 stores as appropriate a program to be executed by the CPU 61, and data necessary for the CPU 61 to execute various kinds of processing.

The input unit 66 includes a keyboard, a mouse, a microphone, and the like. When the input unit 66 is operated by the user, the input unit 66 supplies an input signal based on the operation to the CPU 61 via the input/output interface 65 and the bus 64. The output unit 67 includes a display, such as a CRT (Cathode Ray Tube) or an LCD, a speaker, and the like.

The storage unit 68 includes a hard disk, a flash memory, and the like, and stores a program executed by the CPU 61, data transmitted to the server 13 via the network 14, and the like. Furthermore, the storage unit 68 has stored therein an IC card registration table (FIG. 8 to be described later) that is referred to when authentication for the access request for the server 13 is to be performed. In the IC card registration table, card IDs of IC cards by which the storage area of the storage unit 68 provided by the server 13 can be used and addresses indicating storage areas assigned to the IC cards are registered in such a manner as to correspond to each other.

The communication unit 69 includes a modem, a terminal adaptor, and other communication interfaces, and performs a communication process via the network 14 of FIG. 1.

A removable medium 71 formed of a magnetic disk, an optical disc, a magneto-optical disc, or a semiconductor memory is loaded as appropriate into the drive 70. The drive 70 reads data recorded on the removable medium 71 or records predetermined data on the removable medium 71.

In the server 13 configured as described above, for example, when a command requesting access to the storage area A indicated by the address stored in the IC card 15a is transmitted from the video camera 11, the communication unit 69 receives the command from the video camera 11 and supplies it to the CPU 61 via the input/output interface 65 and the bus 64. The command from the video camera 11 contains the card ID and the address, which are stored in the IC card 15a. By referring to the IC card registration table stored in the storage unit 68, the CPU 61 performs authentication for the access request from the video camera 11.

For example, if the card ID and the address contained in the command from the video camera 11 are registered in such a manner as to correspond to each other in the IC card registration table stored in the storage unit 68, the CPU 61 succeeds in the authentication for the access request from the video camera 11. On the other hand, if the card ID and the address contained in the command from the video camera 11 are not registered in such a manner as to correspond to each other in the IC card registration table stored in the storage unit 68, the CPU 61 fails in the authentication for the access request from the video camera 11.

When the CPU 61 succeeds in the authentication for the access request from the video camera 11, under the control of the CPU 61, the communication unit 69 transmits a response indicating the fact that the authentication has been successful to the video camera 11. Thereafter, when the video image captured by the image-capturing unit 23 is transmitted from the transmitter 25 of the video camera 11, the communication unit 69 receives the video image transmitted from the video camera 11 and supplies it to the storage unit 68 via the input/output interface 65. Then, the CPU 61 controls the storage unit 68 so that the video image from the video camera 11 is stored in the storage area A, which is part of the storage area of the storage unit 68.

Furthermore, in the server 13, for example, when a command requesting access to the storage area B indicated by the address stored in the IC card 15b is transmitted from the television receiver 12, the communication unit 69 receives the command from the television receiver 12 and supplies it to the CPU 61. The command from the television receiver 12 contains the card ID and the address stored in the IC card 15b. The CPU 61 performs authentication for the access request from the television receiver 12 by referring to the IC card registration table stored in the storage unit 68.

Then, when the CPU 61 succeeds in the authentication for the access request from the television receiver 12, the communication unit 69 transmits a response indicating the fact that the authentication has been successful to the television receiver 12 under the control of the CPU 61.

Thereafter, when a command requesting for a list of video images stored in the storage area B is transmitted from the television receiver 12, under the control of the CPU 61, the communication unit 69 transmits a list of video images stored in the storage area B if the video images are stored in the storage area B, which is part of the storage area of the storage unit 68, and transmits information indicating the fact that the storage area B is vacant if no video image is stored in the storage area B. Then, when a command requesting for the transmission of the video image specified by the user among the video images contained in the list is transmitted from the television receiver 12, the communication unit 69 receives the command and supplies it to the CPU 61. The CPU 61 reads, from the storage area B of the storage unit 68, the video image requested by the command from the television receiver 12 and supplies the video image to the communication unit 69. The communication unit 69 transmits the video image to the television receiver 12 via the network 14.

Figure 5:
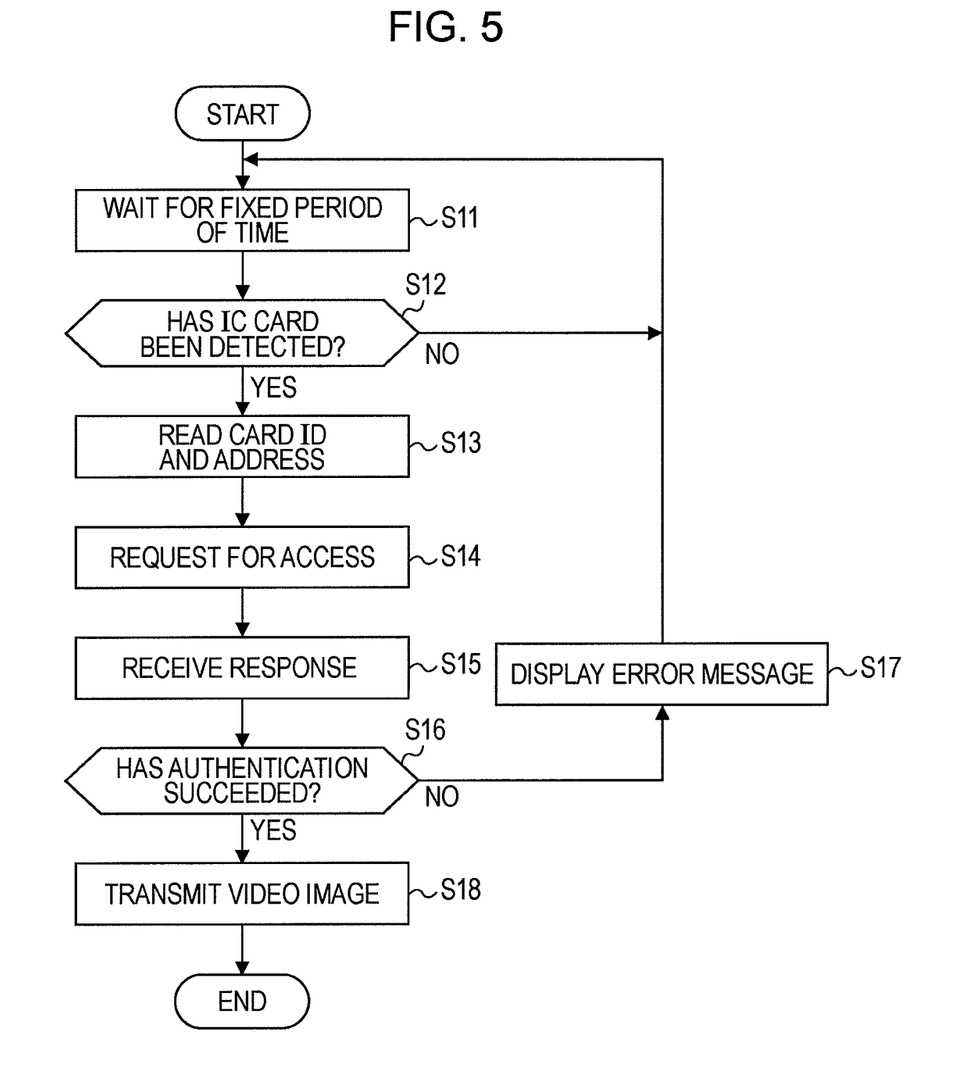
FIG. 5 is a flowchart illustrating the processing of the video camera 11.

Next, FIG. 5 is a flowchart illustrating processing in which the video camera 11 of FIG. 2 stores a video image in the server 13 of FIG. 4.

For example, when the user operates a power button (not shown) provided in the input unit 21 of the video camera 11 and the power supply of the video camera 11 is switched on, the processing is started. In step S11, the card R/W 22 waits for processing for a predetermined period of time.

When a fixed period of time has passed, the process proceeds to step S12, where the card R/W 22 determines whether or not an IC card has been detected, that is, whether or not the IC card has been brought within a communicable range of the card R/W 22.

When it is determined in step S12 that the card R/W 22 has not detected an IC card, the process returns to step S11. That is, the card R/W 22 causes the process to wait until it is determined that the IC card has been detected.

Then, when, for example, the user holds the IC card 15a near the card R/W 22, that is, when the IC card 15a is brought within a communicable range of the card R/W 22, the card R/W 22 detects the IC card. It is determined in step S12 that the card R/W 22 has detected an IC card, and the process proceeds to step S13.

In step S13, the card R/W 22 reads, from the IC card 15a, the card ID and the address stored in the IC card 15a held near the card R/W 22 by the user. The card R/W 22 supplies the card ID and the address read from the IC card 15a to the controller 27, and the process then proceeds to step S14.

In step S14, the controller 27 controls the transmitter 25 so that a command requesting access to the storage area indicated by the address supplied from the card R/W 22 in step S13 is transmitted to the server 13 via the network 14 of FIG. 1.

After the process of step S14, the process proceeds to step S15, where the process waits until the receiver 26 supplies a response from the server 13 to the controller 27. Then, when the server 13 transmits the response for the command from the video camera 11 (process of step S44 or S45 in FIG. 7 to be described later), and the receiver 26 receives the response transmitted from the server 13 and supplies the response to the controller 27, the process proceeds to step S16.

In step S16, on the basis of the response from the server 13, which is supplied from the receiver 26 in step S15, the controller 27 determines whether or not the authentication for the command transmitted to the server 13 in step S14 by the server 13 has succeeded.

That is, if the response from the server 13 indicates the fact that the authentication for the access request from the video camera 11 has succeeded, the controller 27 determines that the authentication by the server 13 has succeeded. On the other hand, if the response from the server 13 indicates the fact that the authentication for the access request from the video camera 11 has failed, the controller 27 determines that the authentication by the server 13 has not succeeded.

When it is determined in step S16 that the controller 27 has determined that the authentication by the server 13 has not succeeded, the process proceeds to step S17.

In step S17, the controller 27 causes the display unit 24 to display an error message indicating that access to the server 13 was not possible. The process then returns to step S11, and hereafter identical processing is repeated.

On the other hand, when the controller 27 determines in step S16 that the authentication by the server 13 has succeeded, the process proceeds to step S18.

In step S18, the controller 27 causes the process to wait until an operation for starting recording is performed, for example, until a recording start button (not shown) of the input unit 21 is operated by the user. Then, when the recording start button of the input unit 21 is operated by the user, the controller 27 controls the image-capturing unit 23 so as to supply a video image captured by the image-capturing unit 23 to the transmitter 25. As a result, the transmitter 25 obtains the video image to be stored in the storage area A of the server 13.

Thereafter, under the control of the controller 27, the transmitter 25 supplies the video image captured by the image-capturing unit 23 to the server 13 via the network 14, so that the video image is stored in the storage area A of the server 13 indicated by the address read from the IC card 15a in step S13. The processing is then completed.

As described above, in the video camera 11, when the user holds, for example, the IC card 15a near the card R/W 22, communication with the server 13 is started. In response to the operation for starting recording, the video image captured by the image-capturing unit 23 can be stored in the storage area A of the server 13 indicated by the address stored in the IC card 15a.

As a result, it is possible for the video camera 11 to provide an intuitive operation to the user. For example, in the video camera of the related art, the user starts recording by setting a video cassette tape in the video camera and by performing an operation for starting recording. In comparison, in the video camera 11, in place of an operation for setting a video cassette tape, the IC card 15a needs only be held near the video camera 11, and this is an intuitive operation for the user accustomed to operations for the video camera of the related art.

Figure 6:
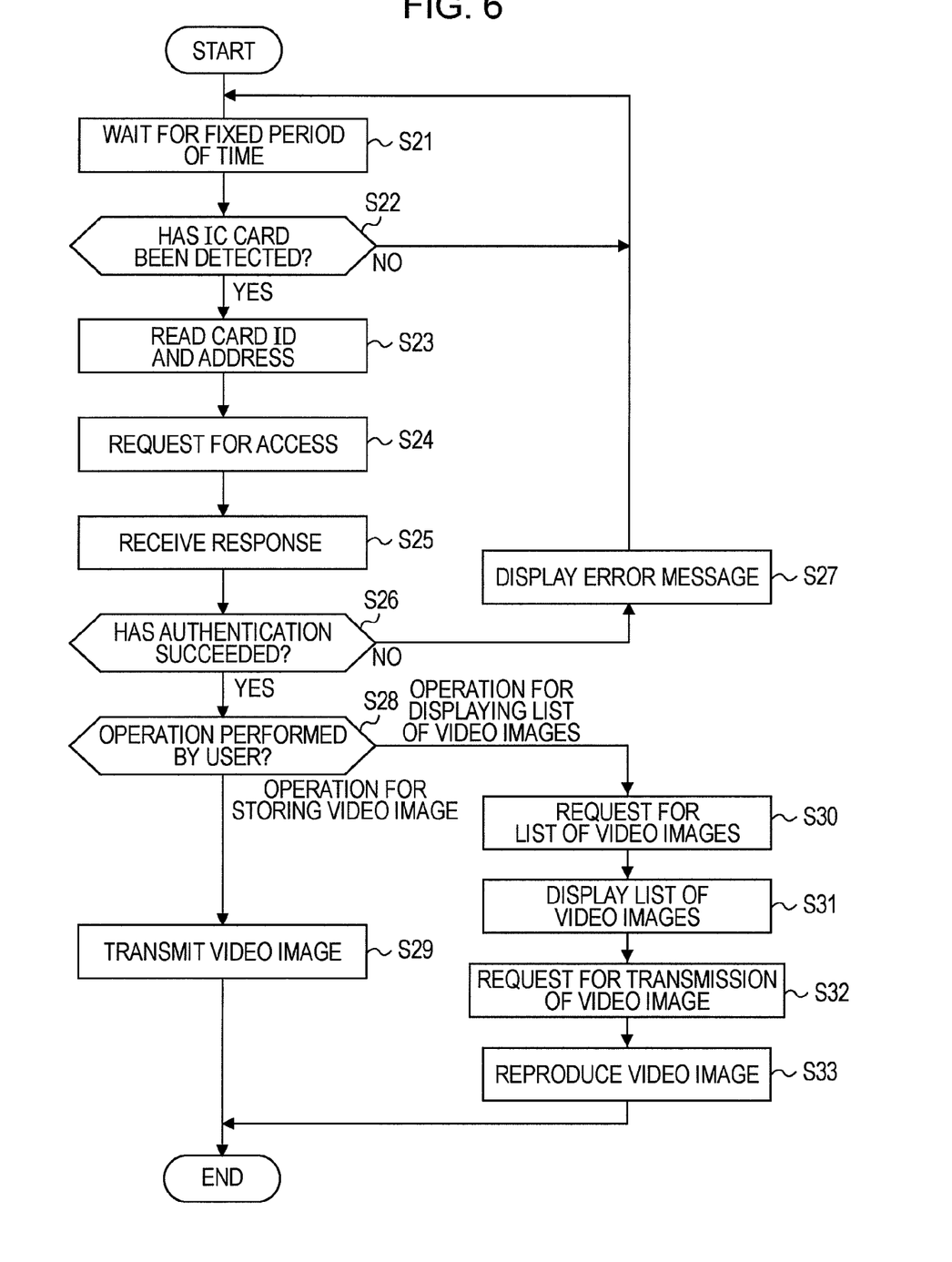
FIG. 6 is a flowchart illustrating the processing of the television receiver 12.

Next, FIG. 6 is a flowchart illustrating processing in which the television receiver 12 of FIG. 3 stores a video image in the server 13 of FIG. 4 or reproduces a video image stored in the server 13.

For example, when the user operates the power button (not shown) provided in the remote commander 48 of the television receiver 12 and the power supply of the television receiver 12 is switched on, the processing is started.

Here, in steps S21 to S27, processing identical to steps S11 to S17 of FIG. 5 is performed, respectively. As a result, in the television receiver 12, a command requesting access to the storage area indicated by the address stored in the IC card held up by the user is transmitted, and a response transmitted in response to the command is received. Then, in step S26, the controller 47 determines whether or not authentication for the access request from the television receiver 12 has succeeded.

In the following description, it is assumed that the user holds the IC card 15b near the card R/W 42 of the television receiver 12 and that an address indicating the storage area B of the server 13 is stored in the IC card 15b. It is also assumed that a video image has already been stored in the storage area B of the server 13.

When it is determined in step S26 that the authentication for the access request from the television receiver 12 has succeeded, the process proceeds to step S28. In this step, the controller 47 causes the process to wait until the remote commander 48 is operated by the user, the remote commander 48 transmits an operation signal in response to the operation of the user to the operation signal receiver 41, and the operation signal is supplied from the operation signal receiver 41. Then, when the operation signal is supplied from the operation signal receiver 41, on the basis of the operation signal, the controller 47 makes a determination as to which one of the operation for storing the video image obtained by the tuner 43 and the operation for displaying a list of video images in order to reproduce the video image stored in the server 13 the operation of the user is.

When the controller 47 determines in step S28 that the operation of the user is an operation for storing the video image obtained by the tuner 43, the process proceeds to step S29.

In step S29, under the control of the controller 47, the tuner 43 supplies the video image that has been determined to be stored in the server 13 to the transmitter 45. As a result, the transmitter 45 obtains the video image that has been determined to be stored in the server 13 and transmits the video image to the server 13 so that the video image is stored in the storage area B of the server 13, which is indicated by the address read from the IC card 15b in step S23. The processing is then completed.

On the other hand, when the controller 47 determines in step S28 that the operation of the user is an operation for displaying a list of video images in order to reproduce the video images stored in the server 13, the process proceeds to step S30. In step S30, under the control of the controller 47, the transmitter 45 transmits, to the server 13, a command requesting for a list of video images stored in the storage area B of the server 13, which is indicated by the address read from the IC card 15*b* in step S23.

After the process of step S30, the process proceeds to step S31, where the receiver 46 receives a list of video images transmitted by the server 13 in response to the command transmitted to the server 13 in step S30, and supplies the list of video images to the controller 47. On the basis of the list of video images supplied from the receiver 46, the controller 47 causes the display unit 44 to display icons showing video images stored in the storage area B of the server 13. The process then proceeds to step S32.

In step S32, the process waits until an operation for causing the television receiver 12 to reproduce a video image is performed, for example, an operation for the user to operate the remote commander 48, select a desired icon, and instruct the reproduction of the video image corresponding to the icon, is performed, and an operation signal corresponding to the operation is supplied from the operation signal receiver 41 to the controller 47. Then, when the operation signal for instructing the reproduction of the video image is supplied from the operation signal receiver 41 to the controller 47, the controller 47 controls the transmitter 45 so that a command requesting for the transmission of the video image whose reproduction has been instructed is transmitted to the server 13.

After the process of step S32, the process proceeds to step S33, where the receiver 46 receives the video image transmitted by the server 13 in response to the command transmitted to the server 13 in step S32 and supplies the video image to the display unit 44. The display unit 44 reproduces the video image supplied from the receiver 46, and the processing is then completed.

As described above, in the television receiver 12, when the user holds, for example, the IC card 15*b* near the card R/W 42, communication with the server 13 is started. The video image that has been determined to be stored in the server 13 can be stored in the storage area B of the server 13 indicated by the address stored in the IC card 15*b*, or the video image stored in the storage area B of the server 13 can be reproduced.

As a result, the user needs only to perform, for example, an operation of holding the IC card 15*b* near the television receiver 12 and starting the reproduction of the video image, similar to an operation of setting a DVD in a DVD player in the related art and starting the reproduction of the video image. As a consequence, it is possible to reproduce the video image stored in the server 13 with an intuitive operation similar to the operation in the related art. That is, it is possible for the user to initiate reproduction of the video image stored in the storage area B of the server 13, as if the video image to be reproduced were actually stored in the IC card 15*b*, with the same operation feeling as that of reproducing a video image recorded on a DVD.

Furthermore, since it is possible for the user to manage video images stored in the storage area associated with a physical IC card, it is possible to easily manage video images in the same manner as in the management of media, such as DVDS. More specifically, in the management of video images using, for example, a GUI, when the hierarchy of folders in which video images are stored becomes deep, it may be difficult to retrieve a video image. In comparison, by managing video images by using physical IC cards, it is possible to prevent a video image from being buried at a deep level of hierarchy, and it is possible to easily find a video image.

Figure 7:
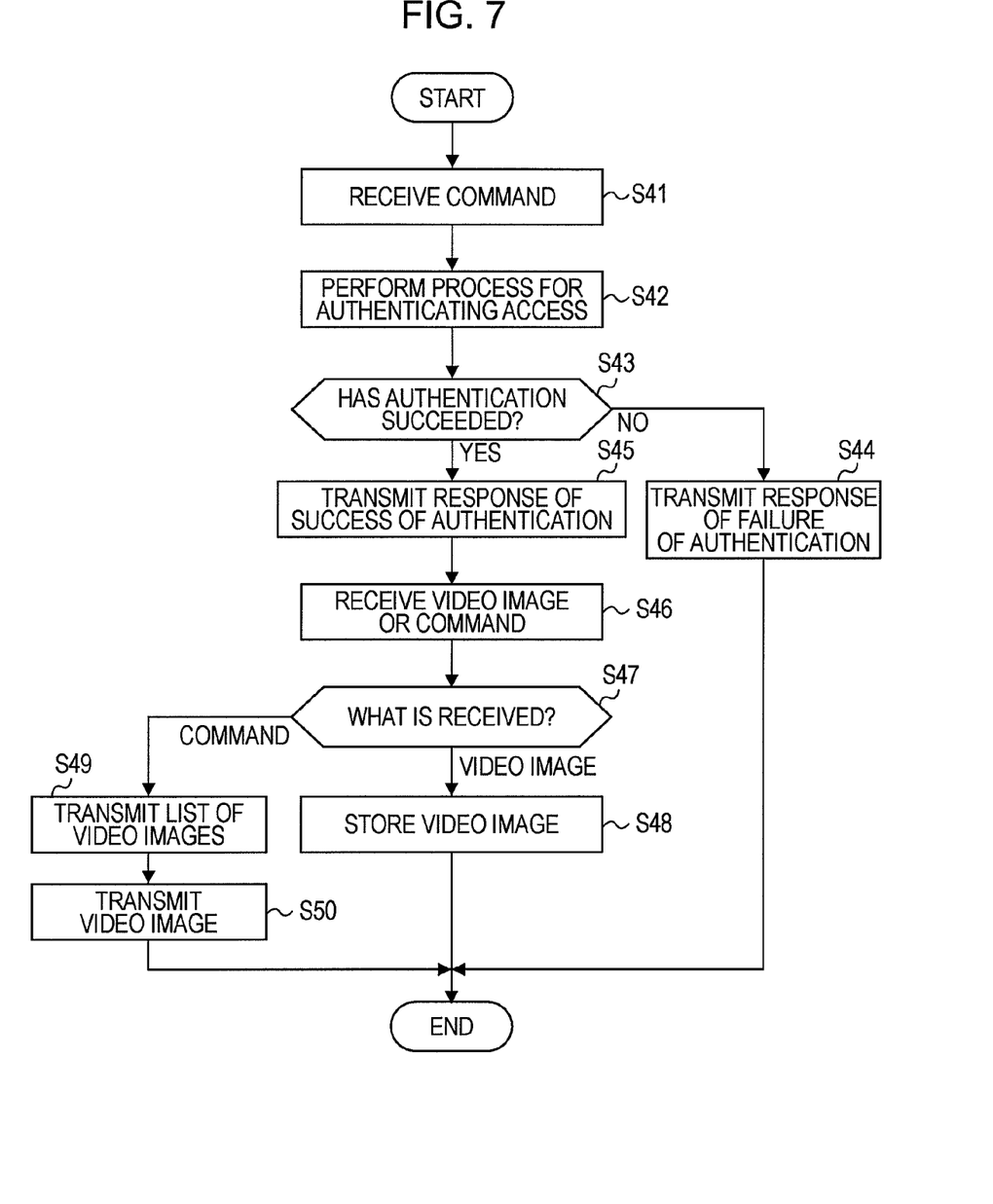
FIG. 7 is a flowchart illustrating the processing of the server 13.

Next, FIG. 7 is a flowchart illustrating a process in which the server 13 of FIG. 4 stores a video image from the television receiver 12 of FIG. 3 or transmits a video image to the television receiver 12.

When a command requesting access is transmitted from the television receiver 12 via the network 14 of FIG. 1, processing is started. In step S41, the communication unit 69 of the server 13 receives the command transmitted from the television receiver 12. The communication unit 69 supplies the command from the television receiver 12 to the CPU 61.

Here, for example, it is assumed that the user holds the IC card 15*b* near the card R/W 42 of the television receiver 12 and the television receiver 12 transmits a command requesting access to the storage area B of the server 13 indicated by the address stored in the IC card 15*b* (process of step S24 in FIG. 6). In this case, the communication unit 69 receives a command containing a card ID and an address, which are stored in the IC card 15*b*.

After the process of step S41, the process proceeds to step S42, where, on the basis of the card ID and the address contained in the command supplied from the communication unit 69, the CPU 61 performs authentication for the access request.

That is, the CPU 61 refers to the IC card registration table (FIG. 8 to be described later) stored in the storage unit 68. If the card ID and the address contained in the command from the television receiver 12 have been registered in such a manner as to correspond to each other in the IC card registration table, the CPU 61 succeeds in the authentication for the access request. On the other hand, if the card ID and the address contained in the command from the television receiver 12 have not been registered in such a manner as to correspond to each other in the IC card registration table, the CPU 61 fails in the authentication for the access request.

After the process of step S42, the process proceeds to step S43, where the CPU 61 determines whether or not the authentication for the access request has succeeded in step S42.

When the CPU 61 determines in step S43 that the authentication for the access request has not succeeded, that is, the authentication has failed, the process proceeds to step S44, where, under the control of the CPU 61, the communication unit 69 transmits, to the television receiver 12, a response indicating that the authentication for the access request has failed. The processing is then completed.

On the other hand, when the CPU 61 determines in step S43 that the authentication for the access request has succeeded, the process proceeds to step S45, where, under the control of the CPU 61, the communication unit 69 transmits, to the television receiver 12, a response indicating that the authentication for the access request has succeeded.

After the process of step S45, the process proceeds to step S46, where the communication unit 69 causes the process to wait until a video image or a command is transmitted from the television receiver 12. Then, when a video image or a command is transmitted from the television receiver 12, the communication unit 69 receives the video image or the command, and the process proceeds to step S47.

In step S47, the CPU 61 makes a determination as to which one of the video image and the command the communication unit 69 has received in step S46.

That is, as described above with reference to FIG. 6, when an operation of storing the video image obtained by the tuner 43 of the television receiver 12 is performed by the user, since the transmitter 45 of the television receiver 12 transmits the video image that has been determined to be stored in the server 13 (process of step S29 in FIG. 6), the communication unit 69 receives the video image. Furthermore, when an operation of displaying a list of video images in order to reproduce the video images stored in the server 13 is performed by the user, since the transmitter 45 of the television receiver 12 transmits a command requesting for a list of video images stored in the storage area B of the server 13 indicated by the address read from the IC card 15b (process of step S30 in FIG. 6), the communication unit 69 receives the command.

When the CPU 61 determines in step S47 that the communication unit 69 has received a video image, the process proceeds to step S48, where, under the control of the CPU 61, the communication unit 69 supplies the video image transmitted from the television receiver 12 to the storage unit 68. The storage unit 68 stores the video image from the communication unit 69 in the storage area B indicated by the address contained in the command requesting access, which is received by the communication unit 69 in step S41. The processing is then completed.

On the other hand, when the CPU 61 determines in step S47 that the communication unit 69 has received a command, the process proceeds to step S49.

In step S49, the CPU 61 controls the communication unit 69 in accordance with the command received by the communication unit 69, that is, in accordance with the command requesting for a list of video images stored in the storage area B of the server 13 so that the list of video images stored in the storage area B is transmitted. The process then proceeds to step S50.

In step S50, the process waits until a command requesting for the transmission of a video image is transmitted from the television receiver 12. In step S32 of FIG. 6, when the transmitter 45 of the television receiver 12 transmits a command requesting for the transmission of the video image whose reproduction has been instructed by the user, the communication unit 69 receives the command from the television receiver 12 and supplies it to the CPU 61. On the basis of the command received by the communication unit 69, the CPU 61 reads, from the storage unit 68, the video image that has been requested to be transmitted, and supplies the video image to the communication unit 69. The communication unit 69 transmits the video image read from the storage unit 68, that is, the video image whose reproduction has been instructed by the user, to the television receiver 12. The processing is then completed.

In FIG. 7, a process in which the server 13 transmits and receives a video image to and from the television receiver 12 has been described. When, for example, the server 13 is to receive a video image captured by the video camera 11 and to store it, a process similar to the process in which the server 13 receives a video image from the television receiver 12 is performed.

Furthermore, the server 13 may transmit a response indicating that the authentication for the access request from the television receiver 12 has succeeded and may also transmit a list of video images stored in the storage area B indicated by the address contained in the command requesting access. In this case, the operation by the user for displaying a list of video images can be omitted.

Figure 8:
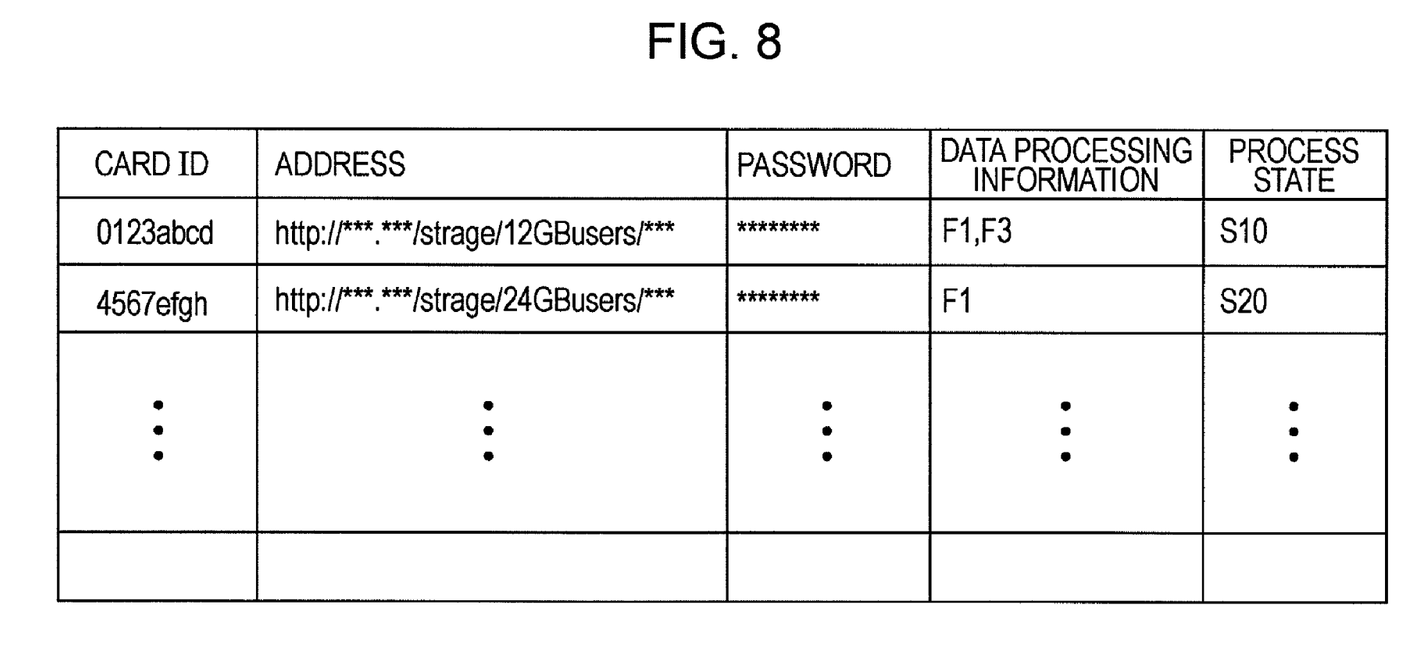
FIG. 8 shows an example of an IC card registration table.

Next, FIG. 8 shows an example of an IC card registration table stored in the storage unit 68 of the server 13.

In FIG. 8, in the IC card registration table, card IDs, addresses, passwords, data processing information, and process states are registered in such a manner as to be correspond to each other.

The card IDs are codes used to identify individual IC cards. In the IC card registration table of FIG. 8, in the entry (record) of the first line from the top, a card ID "0123abcd" is registered. In the entry of the second line from the top, a card ID "4567efgh" is registered. In the following, a description will be given by assuming that the card ID "0123abcd" is used to identify the IC card 15a and the card ID "4567efgh" is used to identify the IC card 15b.

The addresses are codes indicating IC cards identified by corresponding card IDs, that is, storage areas that can be used by the IC cards 15a and 15b. In the IC card registration table of FIG. 8, an address "http://*.*/strage/12GBusers/*" has been registered in correspondence with the card ID "0123abcd" of the IC card 15a, and an address "http://*.*/strage/24 GBusers/*" has been registered in correspondence with the card ID "4567efgh" of the IC card 15b.

Here, the address contains information indicating the storage capacity of the storage area that can be used by each IC card. For example, "12 GBusers" described in the address associated with the card ID of the IC card 15a indicates that the storage capacity of the storage area that can be used by the IC card 15a is 12 gigabytes. "24 GBusers" described in the address associated with the card ID of the IC card 15b indicates that the storage capacity of the storage area that can be used by the IC card 15b is 24 gigabytes.

The storage capacity of the storage area that can be used by the IC card is set in advance according to, for example, the purchase price of the IC card. Furthermore, it is possible for the user to increase the storage capacity of the storage area that can be used by the IC card to a storage capacity proportional to a fee by separately paying the fee after the IC card is purchased. The addresses indicating corresponding storage areas are not restricted to the format described in FIG. 8, and the communication protocol used by the server 13 is also not restricted to HTTP (Hypertext Transfer Protocol).

The passwords registered in the IC card registration table of FIG. 8 are strings of characters or numerals used for the authentication of an access request. In the IC card registration table of FIG. 8, the password "******" of the first line is registered in such a manner as to correspond to the card ID "0123abcd" of the IC card 15a, and the password "****" of the second line is registered in such a manner as to correspond to the card ID "4567efgh" of the IC card 15**b.

Here, as described above, for the authentication for the access request, the server 13 uses the card ID and the address contained in the command requesting access, and can further use a password. The password used for authentication is registered in the IC card registration table by the user who purchased, for example, the IC card 15a or 15b by transmitting a character string that can be known only by the user himself/herself as a password to the server 13.

When the password has been registered as described above, in the server 13, authentication for the access request is not performed unless a command requesting access and also a password are transmitted. If the card ID and the address contained in the command, and the password transmitted together with the command have been registered in such a manner as to correspond to each other in the IC card registration table, the server 13 succeeds in the authentication for the access request.

Therefore, only when the user holds the IC card 15a or 15b near, for example, the video camera 11 and also inputs a correct password to the video camera 11, does the server 13 succeed in the authentication for the access request from the video camera 11. As a result, it is possible for only the user who purchased the IC card 15a or 15b to use the storage area that can be used by the IC card 15a or 15b.

The data processing information registered in the IC card registration table of FIG. 8 indicates data processing provided by the server 13 with respect to data stored at the corresponding address. For example, data processing information "F1"

indicates a camera-shake correction process, and data processing information "F3" indicates a high resolution transformation process.

Here, the server 13 can perform data processing, such as a high resolution transformation process for performing transformation of a resolution, for the purpose of making the resolution of the video image a higher resolution, on a video image that has been transmitted from the video camera 11 or the television receiver 12 and that is to be stored in a predetermined storage area or data processing such as a camera-shake correction process for correcting camera-shake at the time of capturing the video image.

This data processing information is set in advance for each IC card. As a result of the data processing information "F1" and "F3" being registered in such a manner as to correspond to the card ID "0123abcd" of the IC card 15a, when a video image is transmitted and stored in the storage area that can be used by the IC card 15a, a camera-shake correction process and a high resolution transformation process are performed on the video image. Furthermore, as a result of the data processing information "F1" being registered in such a manner as to correspond to the card ID "4567efgh" of the IC card 15b, when a video image is transmitted and stored in the storage area that can be used by the IC card 15b, a camera-shake correction process is performed on the video image.

For example, by purchasing an IC card that has been set so that data processing necessary for the user himself/herself is provided by the server 13, it is possible for the user to cause data processing to be performed on the data stored in the server 13. Furthermore, when the server 13 becomes able to provide new data processing after the user purchases the IC card, it is possible for the user to receive data processing from the server 13 by paying a fee as necessary.

As described above, as a result of the server 13 providing data processing, for example, even if a video camera owned by the user is not provided with a camera-shake correction function, it is possible for the user to obtain a video image in which the camera shake of the video image has been corrected by transmitting the video image captured by the video camera to the server 13. Furthermore, it is possible for the side that provides such services to flexibly set a fee for each data processing, and a business model that easily collects expenses can be developed.

By causing these data processing operations to be automatically performed by the server 13, it is possible to construct a simple system in which the user only transmits (uploads) data to the server 13. Furthermore, for example, when the user holds the IC card 15a or 15b near the video camera 11 so as to transmit a video image to the server 13, by operating the input unit 21 so that predetermined data processing is performed, a video image to which a flag indicating that predetermined data processing be performed is attached may be transmitted, and the server 13 may perform data processing instructed by the user on the video image.

Process states registered in the IC card registration table of FIG. 8 show whether data processing operations to be performed by the server 13 have been performed or have not yet been performed.

For example, the process state "S10" shows that the data processing for the video image stored at the corresponding address has been performed, and the process state "S20" shows that the data processing for the video image stored at the corresponding address has not yet been performed. In the server 13, data processing that has not yet been performed is performed on the basis of the process state registered in the IC card registration table.

The video camera 11 may transmit, together with a command requesting access, a device ID for identifying the video camera 11 to the server 13. This makes it possible to know that the video images stored in a plurality of storage areas of the server 13 have been captured by the video camera 11.

For example, when the capacity of the storage area A of the server 13 is exceeded while the video image is being stored by the user by holding the IC card 15a near the video camera 11, in the case that the user holds the IC card 15b in place of the IC card 15a near the video camera 11 without interrupting the process for storing the video image, the video image can be stored from the storage area A to the storage area B without being interrupted. In this case, by transmitting the device ID for identifying the video camera 11 to the server 13 so as to correspond to the video image, it is possible to know the fact that the video images stored in the storage areas A and B have been captured by the video camera 11, and it is further possible to know the fact on the basis of the image-capturing time that the video images have been captured continuously.

Furthermore, by storing an address stored in a certain IC card in another IC card, for example, it is possible to share the same storage area among a plurality of users.

In this embodiment, the television receiver 12 has a communication function of communicating with the server 13 via the network 14. In addition, the television receiver 12 may also be configured in such a manner that a display device for reproducing a video image and a communication device for communicating with the server 13 via the network 14 are separate independent devices.

Furthermore, the remote commander 48 of the television receiver 12 can include a card R/W for performing communication with the IC card 15a or 15b. As a result, the user allows the television receiver 12 to communicate with the server 13 by only holding the IC card 15a or 15b at hand of the user near the remote commander 48 without holding the IC card 15a or 15b near the card R/W 22. Therefore, the user is relieved from the time and effort of approaching the television receiver 12 and holding the IC card 15a or 15b near the television receiver 12, making it possible to more easily perform communication with the server 13.

Furthermore, in addition to the IC cards 15a and 15b for performing proximity communication in a non-contact manner, an object storing an address indicating the storage area of the server 13 may include a connection device, such as, for example, a USB (Universal Serial Bus) memory. For example, if the video camera 11 and the television receiver 12 include a USB port for connecting a USB memory, only insertion of a USB memory storing an address into the USB port enables communication with the server 13.

When the television receiver 12 includes a storage unit such as a hard disk, it is possible to store an address indicating a predetermined storage area of the storage unit in the IC card 15a or 15b. That is, in addition to using the IC card 15a or 15b when a video image is to be stored in the server 13 via the network 14, the IC card 15a or 15b can be used when a video image is to be stored in the television receiver 12. Also, in this case, since the user manages video images using a physical IC card, it is possible to more easily manage video images stored inside the television receiver 12 than manage them using a GUI or the like.

The processes described with reference to the above-described flowcharts need not necessarily be performed in a time-series manner according to the written order as the flowcharts, but include processes that are performed in parallel or individually (for example, parallel processes or object-oriented processes). Furthermore, the program may be processed by one CPU or may be processed by a plurality of CPUs in a distributed manner.

In this specification, the system designates the entire apparatus formed of a plurality of devices.

Here, in the server 13, a program to be executed by the CPU 61 can be recorded on the removable medium 71, so that, when the removable medium 71 is loaded into the drive 70, the program can be installed into the storage unit 68 via the drive 70 and the input/output interface 65. Furthermore, in addition to the program being installed into the storage unit 68 via the removable medium 71, the program to be executed by the CPU 61 can be downloaded from a download site into the server 13 in a wireless manner via an artificial satellite for a digital satellite broadcast, or can be downloaded in a wired manner via a network such as a LAN or the Internet and installed into the storage unit 68.

Furthermore, the program to be executed by the CPU 28 of the video camera 11 and the CPU 49 of the television receiver 12, similarly to the program of the server 13, can be installed into the memory 29 of the video camera 11 and the memory 50 of the television receiver 12.

It should be understood by those skilled in the art that various modifications, combinations, sub-combinations and alterations may occur depending on design requirements and other factors insofar as they are within the scope of the appended claims or the equivalents thereof.

What is claimed is:

1. A data management apparatus for managing data including video image data stored in a predetermined storage area, the data management apparatus comprising:
    reading means for communicating with a plurality of objects each having a memory storing an address indicating a storage area and for reading the address from the memory of an object with which communication is to be performed by a user among the plurality of objects;
    data obtaining means for obtaining data to be stored in the storage area; and
    storage control means for causing the data obtained by the data obtaining means to be stored in the storage area indicated by the address read by the reading means,
    wherein the storage control means further determines whether the data needs to be processed by an image processing function based on an IC card registration table,
    wherein the IC card registration table associates identification information of the IC card with at least the address, a camera shake correction processing function, a resolution transformation processing function, a password, and a process state, and
    wherein the address includes information indicating a capacity of the storage area, and the reading means further reads from the object a password that is used for an authentication process during storing of the data in the storage area.

2. The data management apparatus according to claim 1, further comprising:
    data list obtaining means for obtaining a data list that is a list of data stored in the storage area indicated by the address read by the reading means; and
    data reading means for reading, from the storage area, data specified by the user within the data contained in the data list obtained by the data list obtaining means.

3. The data management apparatus according to claim 1, wherein the storage area is provided in a server connected to the data management apparatus via a network, and the storage control means causes the data obtained by the data obtaining means to be transmitted to the server via the network and to be stored in the storage area.

4. The data management apparatus according to claim 3, wherein, in the memories of the plurality of objects, identification codes for identifying the corresponding plurality of objects are stored,
    the reading means further reads the identification code from the memory of the object, and
    the storage control means transmits the address and the identification code read from the memory to the server so as to request access to the server, and transmits the data obtained by the data obtaining means to the server and stores the data in the storage area when an authentication for the access request succeeds.

5. The data management apparatus according to claim 3, wherein, when the storage area is associated with a predetermined data processing, the server performs the predetermined data processing on the data stored in the storage area.

6. The data management apparatus according to claim 1, wherein the data obtaining means is image-capturing means for capturing a video image of a subject, and
    the storage control means causes the video image captured by the image-capturing means to be stored in the storage area indicated by the address.

7. The data management apparatus according to claim 1, wherein the data obtaining means is demodulation means for demodulating a broadcast signal, and
    the storage control means causes a video image obtained as a result of the demodulation means demodulating the broadcast signal to be stored in the storage area indicated by the address.

8. A data management method for managing data including video image data stored in a predetermined storage area, the data management method comprising the steps of:
    communicating with a plurality of objects each having a memory storing an address indicating a storage area and reading the address from the memory of an object with which communication is to be performed by a user among the plurality of objects;
    obtaining data to be stored in the storage area; and
    causing the data to be stored in the storage area indicated by the address,
    wherein the causing step further determines whether the data needs to be processed by an image processing function based on an IC card registration table,
    wherein the IC card registration table associates identification information of the IC card with at least the address, a camera shake correction processing function, a resolution transformation processing function, a password, and process states, and
    wherein the address includes information indicating a capacity of the storage area, and the communicating step further reads from the object a password that is used for an authentication process during storing of the data in the storage area.

9. A non-transitory storage medium storing a program for causing a computer to perform a data management process for managing data including video image data stored in a predetermined storage area, the data management process comprising the steps of:
    communicating with a plurality of objects each having a memory storing an address indicating a storage area and reading the address from the memory of an object with which communication is to be performed by a user among the plurality of objects;
    obtaining data to be stored in the storage area; and causing the data to be stored in the storage area indicated by the address, wherein the causing step further determines whether the data needs to be processed by an image processing function based on an IC card registration table, wherein the IC card registration table associates identification information of the IC card with at least the address, a camera shake correction processing function, a resolution transformation processing function, a password, and process states, and wherein the address includes information indicating a capacity of the storage area, and the communicating step further reads from the object a password that is used for an authentication process during storing of the data in the storage area.

10. A data management apparatus for managing data including video image data stored in a predetermined storage area, the data management apparatus comprising:

a reader configured to communicate with a plurality of objects each having a memory storing an address indicating a storage area and to read the address from the memory of an object with which communication is to be performed by a user among the plurality of objects;

a data obtaining unit configured to obtain data to be stored in the storage area; and a storage controller configured to cause the data obtained by the data obtaining means to be stored in the storage area indicated by the address read by the reading, wherein the storage controller further determines whether the data needs to be processed by an image processing function based on an IC card registration table, wherein the IC card registration table associates identification information of the IC card with at least the address, a camera shake correction processing function, a resolution transformation processing function, a password, and process states, and wherein the address includes information indicating a capacity of the storage area, and the reader further reads from the object a password that is used for an authentication process during storing of the data in the storage area.

* * * * *